(12) United States Patent
Jaradi et al.

(10) Patent No.: US 9,789,848 B2
(45) Date of Patent: Oct. 17, 2017

(54) SEAT-BELT RETRACTOR ASSEMBLY

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammed Omar Faruque, Ann Arbor, MI (US); Mohammed Shenaq, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/070,304

(22) Filed: Mar. 15, 2016

(65) Prior Publication Data

US 2017/0267210 A1   Sep. 21, 2017

(51) Int. Cl.
*B60R 22/415* (2006.01)
*B60R 22/34* (2006.01)
*B60R 22/38* (2006.01)

(52) U.S. Cl.
CPC ........ *B60R 22/415* (2013.01); *B60R 22/3413* (2013.01); *B60R 2022/385* (2013.01)

(58) Field of Classification Search
CPC ....... B60R 22/415; B60R 22/28; B60R 22/36; B60R 22/341; B60R 22/3413; B60R 22/4676; B60R 22/105; B60R 2022/286
USPC ........ 242/379.1, 382.2, 382.1, 382; 280/805, 280/806, 807; 297/470, 471, 472, 474
See application file for complete search history.

(56) References Cited

U.S. PATENT DOCUMENTS

| | | | |
|---|---|---|---|
| 4,537,363 A | 8/1985 | Thomas | |
| 4,765,558 A | 8/1988 | Higbee | |
| 5,234,181 A * | 8/1993 | Schroth | B60R 22/1953 244/122 B |
| 6,416,008 B1 * | 7/2002 | Fujii | B60R 22/4676 242/379.1 |
| 6,986,480 B2 | 1/2006 | Blum et al. | |
| 7,410,114 B2 * | 8/2008 | Webber | B60R 22/3413 242/379.1 |
| 2001/0050474 A1 | 12/2001 | Nagata et al. | |
| 2004/0056136 A1 * | 3/2004 | Blum | B60R 22/3413 242/379.1 |
| 2006/0006725 A1 | 1/2006 | Gentner et al. | |

(Continued)

FOREIGN PATENT DOCUMENTS

| | | |
|---|---|---|
| DE | 10146311 A1 | 4/2003 |
| JP | 4569809 | 10/2010 |
| KR | 100461311 | 12/2004 |

(Continued)

OTHER PUBLICATIONS

UKIPO Search Report for Application No. GB1704039.5 dated Aug. 30, 2017 (4 pages).

*Primary Examiner* — Keith J Frisby
(74) *Attorney, Agent, or Firm* — Frank A. MacKenzie; Bejin Bieneman PLC

(57) ABSTRACT

A restraint system includes a housing, a spool, a disc, a cutter, a plate, and an actuator. The spool is rotatably coupled to the housing. The disc is fixed to the spool. The cutter is moveable along a path from a spaced position away from the disc to a cutting position adjacent the disc. The plate is moveable between an engaged position extending in the path and a disengaged position spaced from the path. The actuator is coupled to the plate.

20 Claims, 9 Drawing Sheets

(56) References Cited

U.S. PATENT DOCUMENTS

2006/0163410 A1\* 7/2006 Blum .................. B60R 22/3413
                                                        242/379.1
2009/0014577 A1\* 1/2009 Elsaesser ............ B60R 22/3413
                                                        242/487.6

FOREIGN PATENT DOCUMENTS

| SE | DE-19648472 C1 \* | 7/1998 | ......... B60R 22/3413 |
| --- | --- | --- | --- |
| WO | WO 0009368 | 2/2000 | |

\* cited by examiner

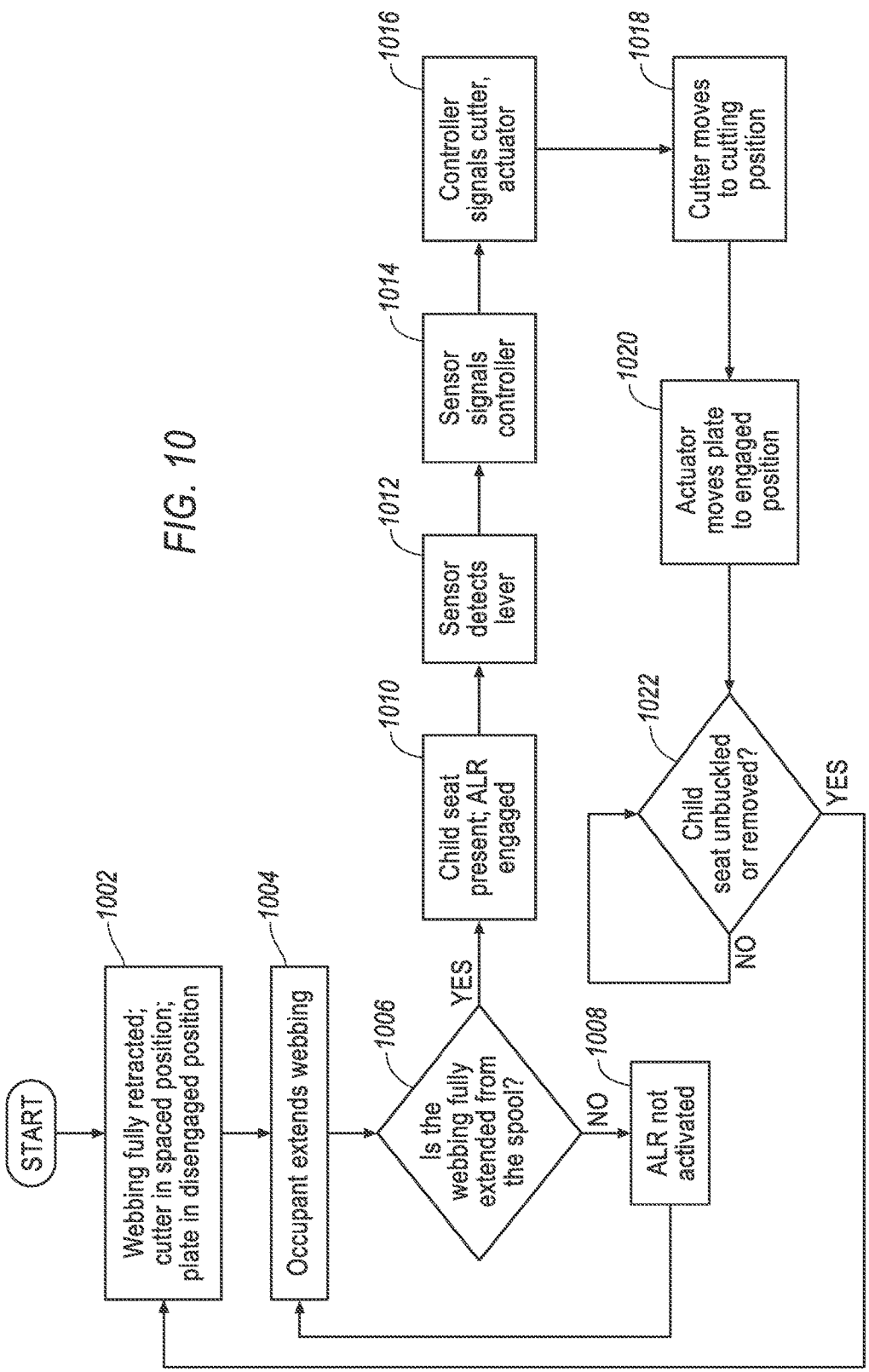

SEAT-BELT RETRACTOR ASSEMBLY

BACKGROUND

A seat belt in a vehicle may be equipped with "load limiting" features. During a collision, a retractor of the seat belt may lock webbing of the seat belt from further extension from the retractor, but load limiting features permit some additional limited extension of the webbing when the force exerted on the webbing exceeds a load-limiting threshold.

Different load-limiting thresholds may be applicable to different types of occupant. A relatively low load-limiting mode, i.e., a lower threshold force before the webbing extends, may be applicable to adults. On the other hand, a relatively high-load limiting mode may be applicable to an infant or young child in a child car seat installed to the vehicle seat, in which case the child car seat is more firmly positioned on the vehicle seat.

Another feature of a seat belt that may be helpful to child car seats is an automatic locking retractor. When an automatic locking retractor is engaged, the webbing of the seat belt is permitted to retract but not extend. The webbing of the seat belt then may keep the child car seat more firmly positioned on the vehicle seat.

BRIEF DESCRIPTION OF THE DRAWINGS

FIG. 10 is a process flow diagram of the restraint system.

DETAILED DESCRIPTION

Figure 1:
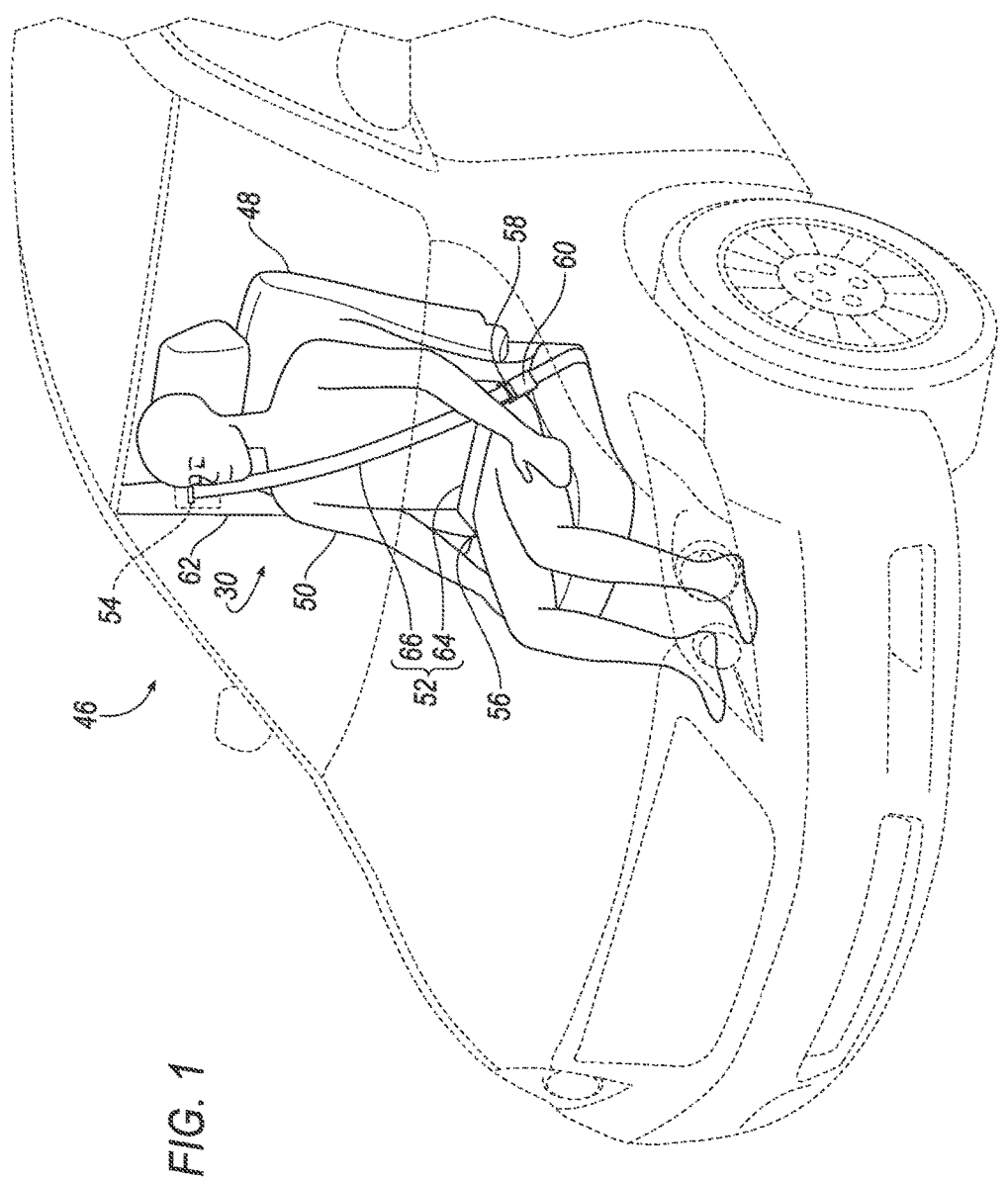
FIG. 1 is a perspective view of a vehicle seat with a restraint system in a vehicle.
Figure 2:
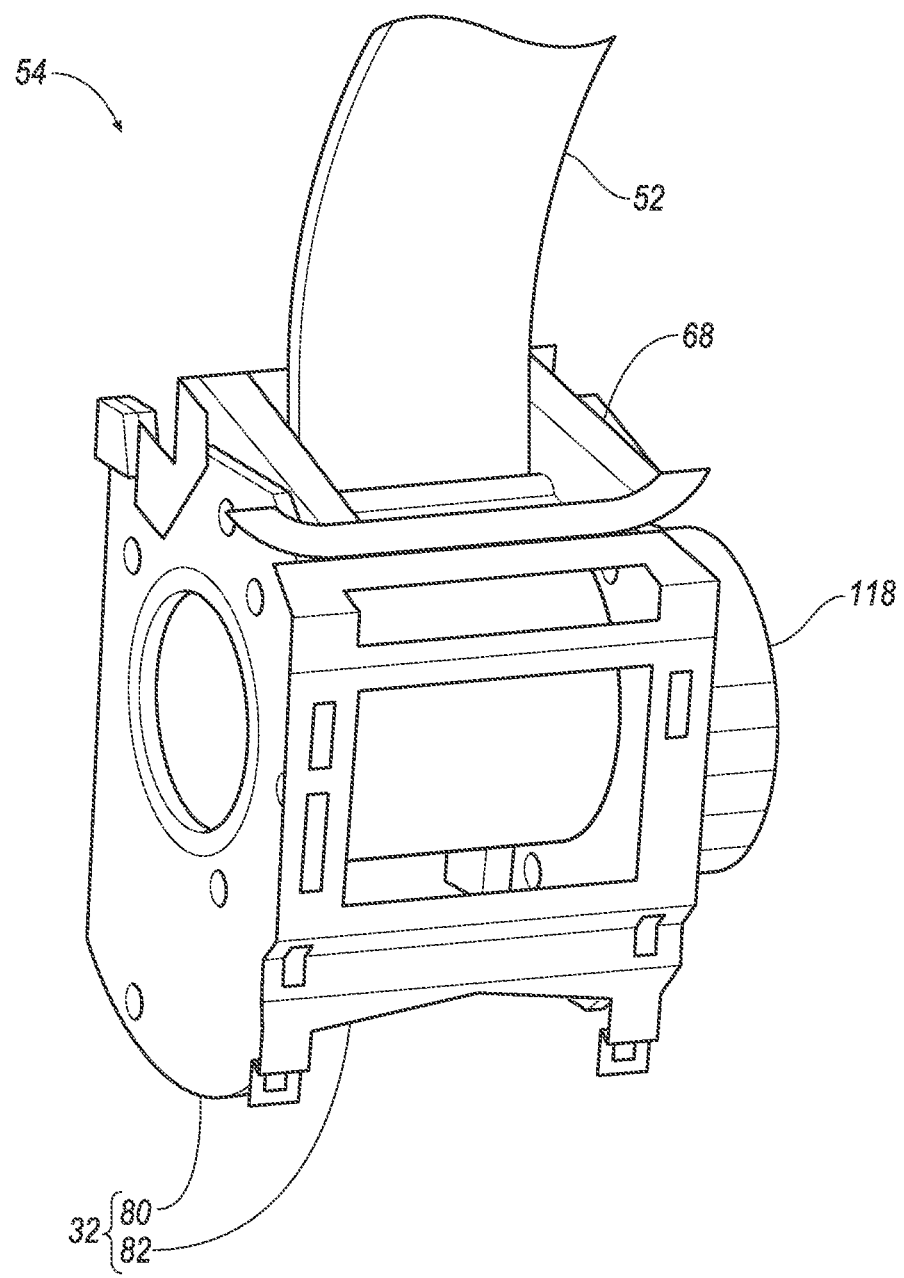
FIG. 2 is a perspective view of a portion of the restraint system.

With reference to the Figures, wherein like numerals indicate like parts throughout the several views, a restraint system 30 includes a housing 32, a spool 34, a disc 36, a cutter 38, a plate 40, and an actuator 42. The spool 34 is rotatably coupled to the housing 32. The disc 36 is fixed to the spool 34. The cutter 38 is moveable along a path P from a spaced position away from the disc 36 to a cutting position adjacent the disc 36. The plate 40 is moveable between an engaged position extending in the path P and a disengaged position spaced from the path P. The actuator 42 is coupled to the plate 40.

The restraint system 30 provides a redundancy to keep the restraint system 30 in a high load-limiting state, for example, when an automatic locking retractor 44 is in an engaged state, as set forth further below. When the cutter 38 is in the cutting position, the cutter 38 raises the load-limiting threshold. The plate 40 helps ensure that the cutter 38 does not slip out of the cutting position. On the other hand, the plate 40 may move to the disengaged position, allowing the cutter 38 to move to a spaced position relative to the disc 36 and putting the restraint system 30 in a low load-limiting state that may be more appropriate, for example, when the automatic locking retractor 44 is in a disengaged state.

With reference to FIG. 1, a vehicle 46 includes a seat 48 that may support an occupant 50. The seat 48 may be a front seat or a rear seat, and may be in any cross-vehicle position. The seat 48 shown in FIG. 1 is a bucket seat, but alternatively the seat 48 may be a bench seat or another type of seat. The occupant 50 may be an adult or adolescent, or may alternatively be a child car seat for supporting an infant or young child.

The restraint system 30 may include a retractor assembly 54, webbing 52 retractably payable from the retractor assembly 54, a lap belt mounting 56 coupled to the webbing, and a clip 58 that engages a buckle 60. The restraint system 30, when fastened, retains the occupant 50 on the seat 48, e.g., during sudden decelerations of the vehicle 46.

The retractor assembly 54 may be attached to a body (not numbered) of the vehicle 46, e.g., to a B pillar 62 in the instance the seat 48 is a front seat, to a C pillar (not numbered) when the seat 48 is a rear seat, etc. The retractor assembly 54 may alternatively be mounted to the seat 48.

The lap belt mounting 56 attaches one end of the webbing 52 to the seat 48. The other end of the webbing 52 feeds into the retractor assembly 54. The clip 58 slides freely along the webbing 52 and, when engaged with the buckle 60, divides the webbing 52 into a lap band 64 and a shoulder band 66.

The restraint system 30 of FIG. 1 is a three-point harness, meaning that the webbing 52 is attached at three points around the occupant 50 when fastened: the lap-belt mounting, the retractor assembly 54, and the buckle 60. The restraint system 30 may, alternatively, include another arrangement of attachment points.

The retractor assembly 54 may be contained in the housing 32. The housing 32 may include a housing body 80 and a housing cover 82 attached to the housing body 80. The housing 32 may be formed of metal or plastic. The housing 32 may be mounted to a body (not numbered) of the vehicle 46, e.g., to the B pillar 62 in the instance the seat 48 is a front seat, to a C pillar (not numbered) when the seat 48 is a rear seat, or may be mounted to the seat 48.

Figure 3:
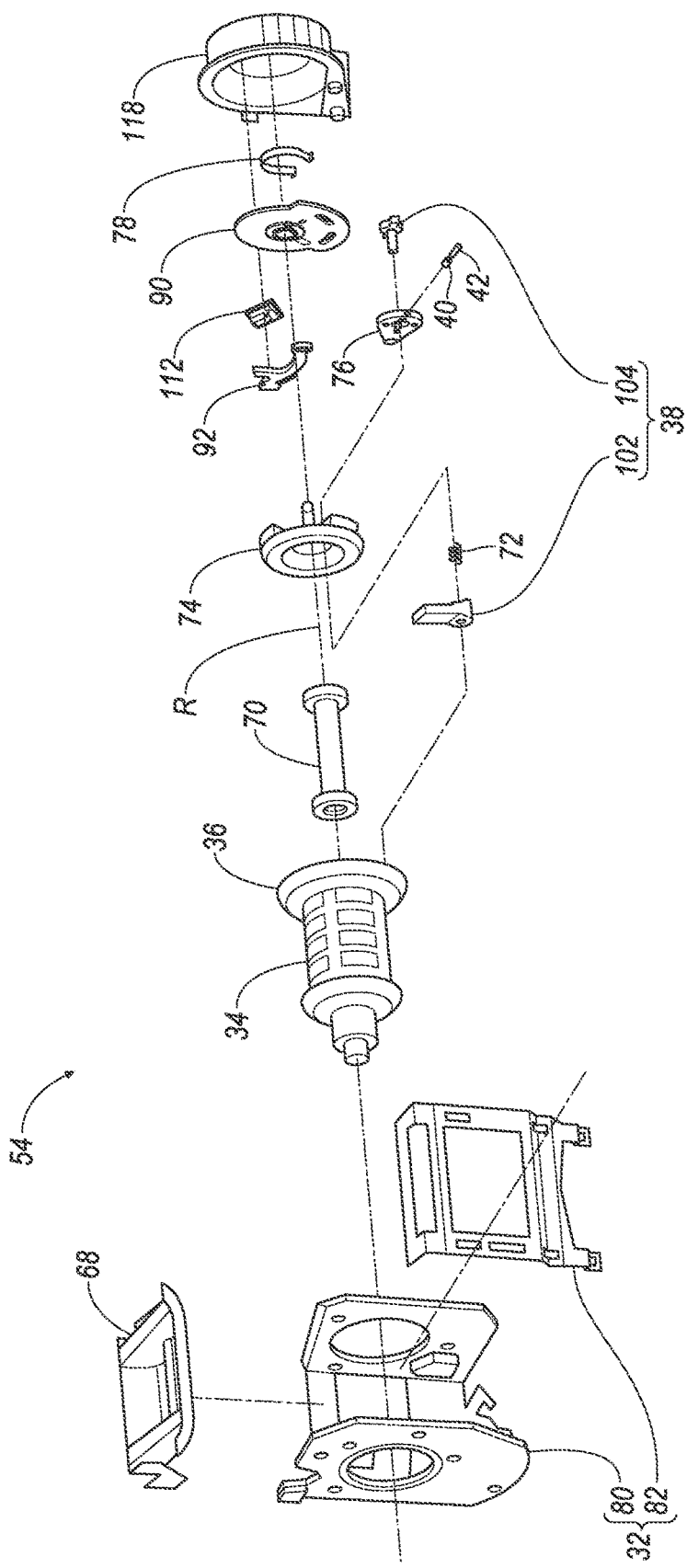
FIG. 3 is an exploded view of a retractor assembly of the restraint system.
Figure 4:
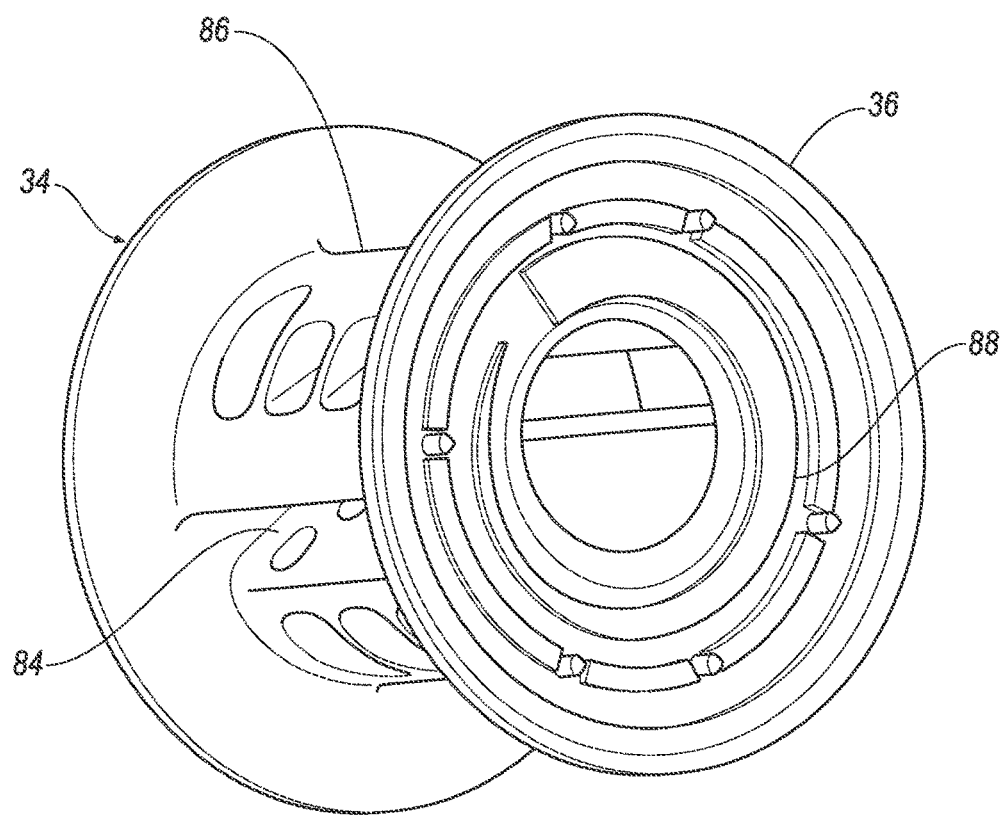
FIG. 4 is a perspective view of a spool of the retractor assembly.

With reference to FIGS. 3 and 4, the spool 34 is rotatably coupled to the housing 32. The spool 34 may freely rotate relative to the housing 32. The spool 34 may be cylindrical in shape. The spool 34 may define a rotation axis R about which the spool 34 rotates. The spool 34 may be adapted to receive the webbing 52, for example, by including a webbing attachment slot 84 and permitting the webbing 52 to wind around the shaft 86 of the spool 34.

The webbing 52 may be attached to the spool 34. Specifically, one end of the webbing 52 may be attached to the lap belt mounting 56, and another end of the webbing 52 may be attached to the spool 34, with the webbing 52 wound around the spool 34 beginning at that end. The webbing 52 may be formed of a fabric in the shape of a strap.

With reference to FIG. 3, a retractor spring 78 may extend from the housing 32 to the spool 34. The retractor spring 78 may be loaded in tension or compression when the webbing 52 is fully retracted, and the retractor spring 78 may be further loaded in either tension or compression when the webbing 52 is extended from the spool 34. Thus, the retractor spring 78 may exert a force tending to retract the webbing 52. The retractor spring 78 may be a spiral torsion spring or any other suitable type of spring.

With reference to FIG. 4, the disc 36 may be fixed to the spool 34. Specifically, the disc 36 may be fixed to one end of the spool 34 and rotate with the spool 34 about the rotation axis R. The disc 36 may be integral with the shaft 86, i.e. formed simultaneously with the shaft 86 as a single continuous unit. Alternatively, the disc 36 may be formed separately and subsequently attached to the shaft 86. The disc 36 may have a circular shape. The disc 36 may be formed of metal or plastic.

The disc 36 may include a circular, tapered strip 88, also referred to as a scarf, radially aligned with the cutter 38 relative to the disc 36. In other words, the strip 88 may be disposed the same distance from the rotation axis R as the cutter 38 is. The strip 88 may extend in a circle centered on the rotation axis R. The strip 88 may progressively increase in width and/or depth from a beginning point around the circle to an end point, which may be located at the beginning point. The strip 88 may be integral with the disc 36, i.e. formed simultaneously with the disc 36 as a single continuous unit. Alternatively, the strip 88 may be formed separately and subsequently attached to the disc 36.

Figure 5:
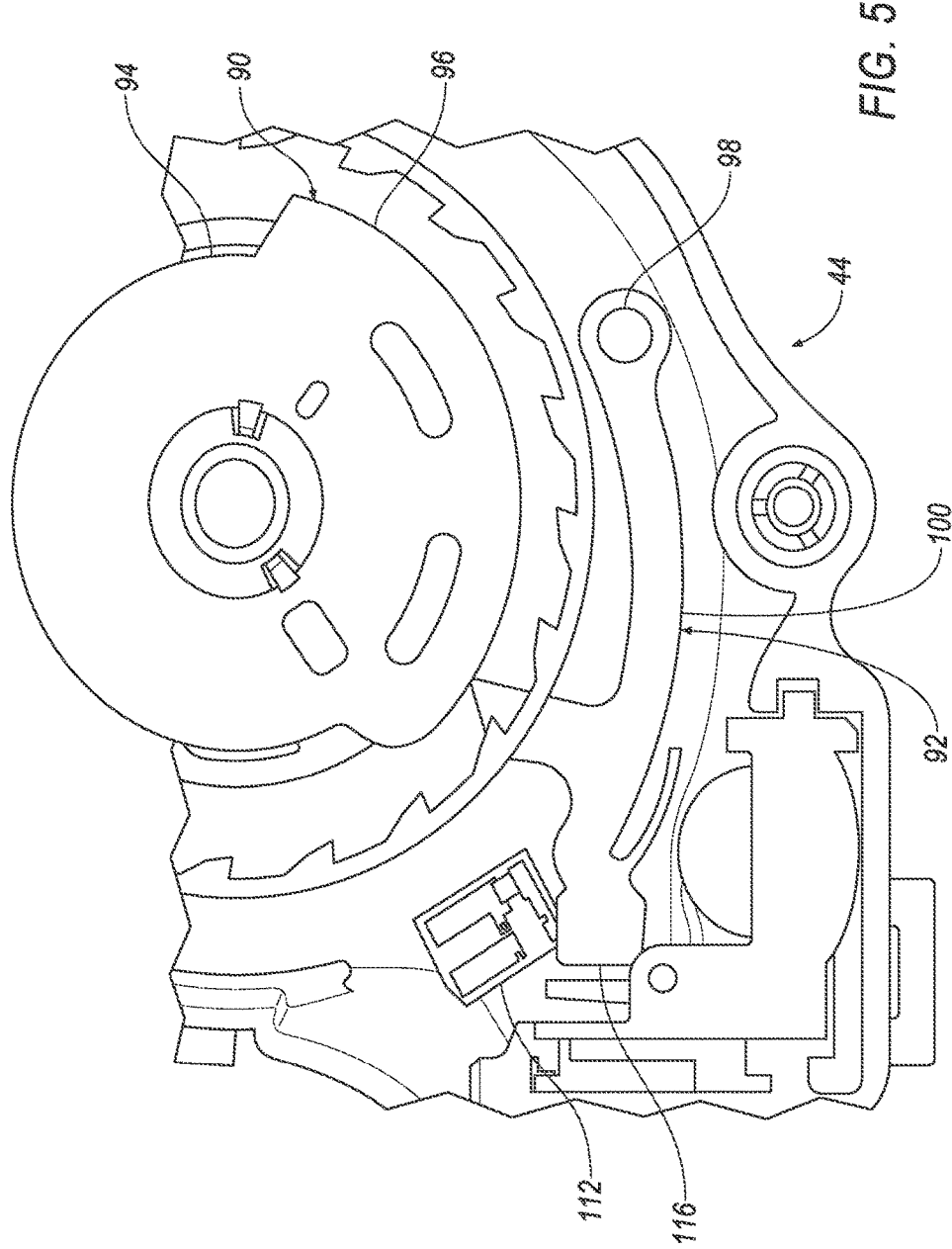
FIG. 5 is a plan view of an automatic locking retractor system of the retractor assembly.

With reference to FIG. 5, the automatic locking retractor 44 may be coupled to the spool 34. An automatic locking retractor cover 118 may be fixed to the housing and may cover the automatic locking retractor 44.

The automatic locking retractor 44 may move between an engaged state (not shown) and a disengaged state, as shown in FIG. 5. The automatic locking retractor 44 may move to the engaged state when the webbing 52 is fully extended from the spool 34. In the disengaged state, the automatic locking retractor 44 allows the spool 34 to freely rotate so that the webbing 52 can extend from the spool 34. In the engaged state, the automatic locking retractor 44 prevents the spool 34 from rotating in one direction, so the webbing 52 can retract but not extract. The automatic locking retractor 44 may include a cam 90 and a lever 92 or any other suitable mechanism.

With continued reference to FIG. 5, the cam 90 may be fixed to the spool 34. The cam 90 may rotate about the rotation axis R with the spool 34. The cam 90 may have a base surface 94 and a cam surface 96. The base surface 94 and the cam surface 96 may follow arcs of circles about the rotation axis R. The cam surface 96 may have a greater radius of curvature than the base surface 94.

The lever 92 may be mounted to the housing 32 and engage the cam 90. The lever 92 may include any structure configured to pivot relative to the housing 32. The lever 92 may be fastened to the housing 32 via, for example, a fastener 98. The lever 92 may pivot relative to the housing 32 with the fastener 98 as a fulcrum. Moreover, the lever 92 may include an arm 100 configured to engage the cam 90. Alternatively, the lever 92 may engage the cam 90 without the arm 100. The lever 92 may have a position that depends on whether the lever 92 engages the base surface 94 or the cam surface 96 of the cam 90. The rotation of the cam 90 may cause the position of the lever 92 to change.

With reference to FIG. 3, a torsion bar 70 may be coupled to the automatic locking retractor 44 and to the spool 34. The torsion bar 70 may be designed to rotationally yield, e.g., plastically deform, as the torsion bar 70 is rotated by the spool 34 but fixed by the automatic locking retractor 44. In particular, the torsion bar 70 may be formed of suitable shape, dimension, and material to yield when subjected to a threshold rotational force. For example, if the automatic locking retractor 44 is in the engaged state but the webbing 52 exerts a rotational force on the spool 34, the torsion bar 70 may prevent the spool 34 from rotating unless the force exceeds a threshold, in which case the rotational yielding may permit the spool 34 to rotate. Thus, the load held by the webbing 52 may be limited.

Figure 6:
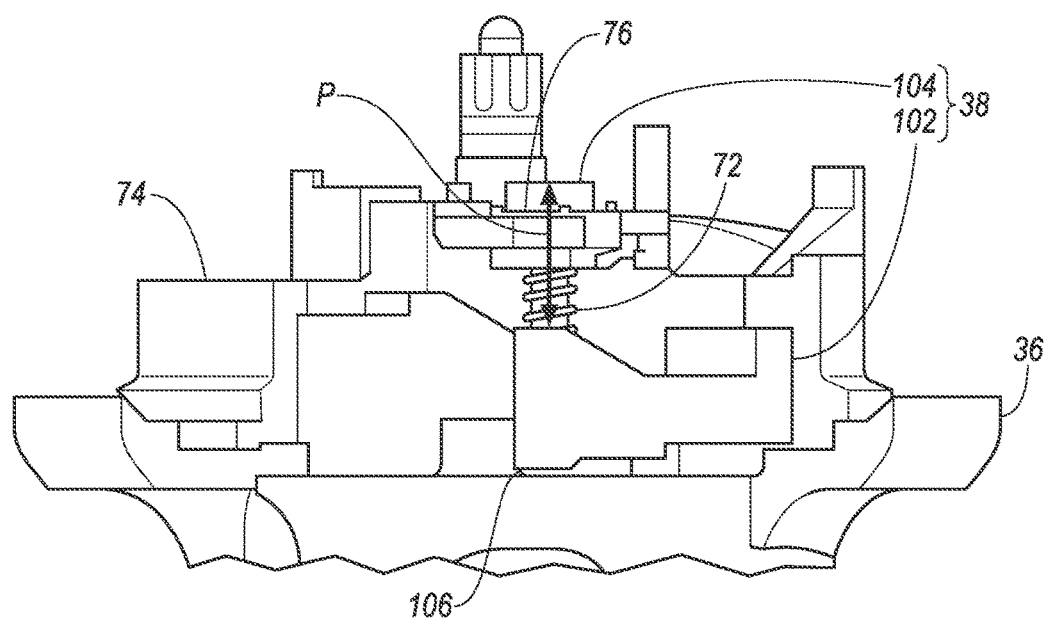
FIG. 6 is a side view of a slotted member and a cutter of the retractor assembly engaged with a cutaway of a portion of the spool.

With reference to FIG. 6, the cutter 38 may be moveably coupled to the housing 32. The cutter 38 may be moveable along the path P from a spaced position (not shown) spaced from the disc 36 to a cutting position adjacent the disc 36, as shown in FIG. 6. The cutter 38 may be positioned at the spaced position when the automatic locking retractor 44 is in the disengaged state and may move to the cutting position when the automatic locking retractor 44 is in the engaged state. In the spaced position, the cutter 38 may be spaced from the disc 36 and thus may avoid touching the disc 36 if the disc 36 rotates. In the cutting position, the cutter 38 may be adjacent the disc 36, so that nothing is between the cutter 38 and the disc 36. If the disc 36 rotates while the cutter 38 is in the cutting position, the cutter 38 may cut away material of the strip 88 from the disc 36, resisting the rotation of the disc 36 and spool 34 and increasing the load limiting. Specifically, in the cutting position, the cutter 38 may be aligned with the strip 88 and may cut away at the strip 88 when the disc 36 rotates.

The cutter 38 may include a cutting member 102 and a key 104. The cutting member 102 and the key 104 may be integral, rigidly attached, or moveably attached.

The cutting member 102 may have a cutting surface 106 directed toward the disc 36. The cutter 38, or at least the cutting surface 106, may be formed of a material that is harder than the material forming the disc 36.

A slotted member 76 may be coupled to the housing 32. Specifically, the slotted member 76 may be fixed relative to the housing 32 so that the slotted member 76 does not rotate with the spool 34 and the disc 36. The slotted member 76 may be disposed next to the disc 36.

Figure 7:
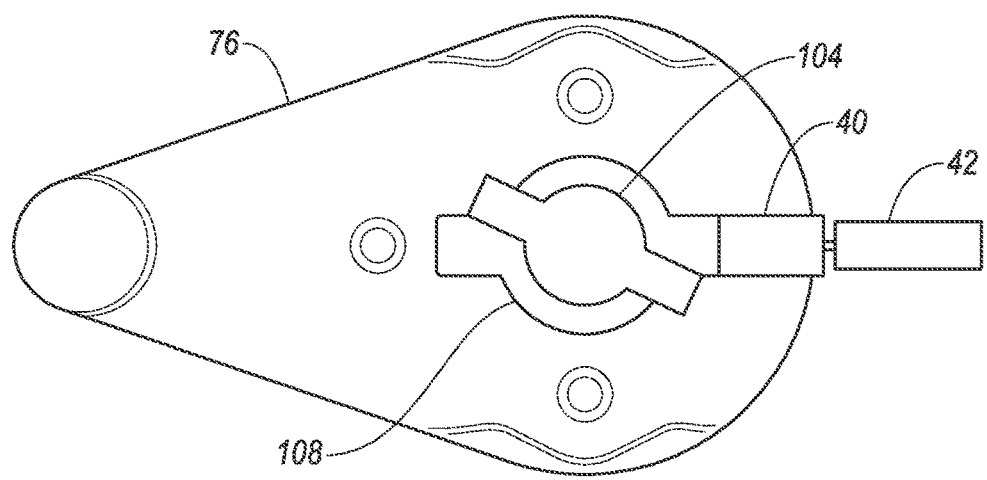
FIG. 7 is a plan view of the slotted member, the cutter, and a plate in a disengaged position of the restraint system.
Figure 8:
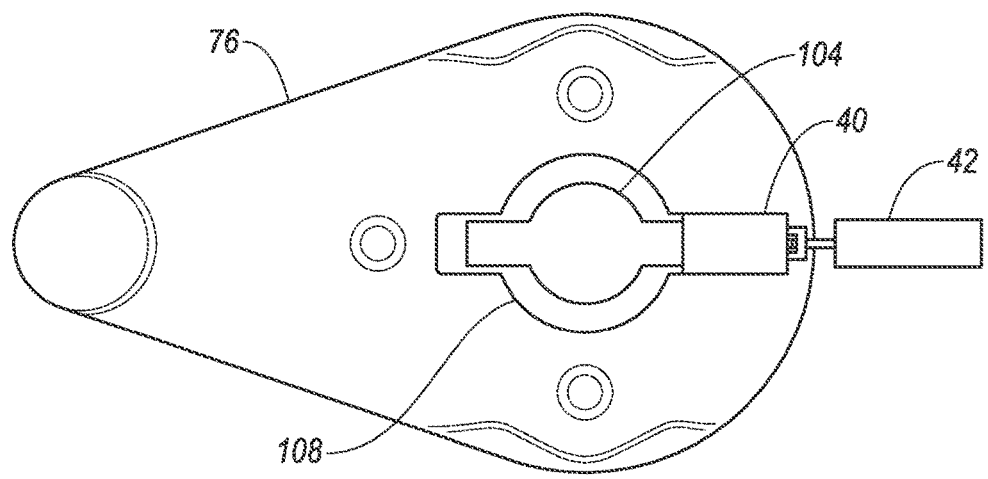
FIG. 8 is a plan view of the slotted member, the cutter, and the plate in an engaged position of the restraint system.

With reference to FIGS. 7 and 8, the slotted member 76 may have a slot 108 disposed on the path P. The slot 108 is positioned to accept the cutter 38. The slot 108 may have a width and a length, and the width may be narrower than the length.

The cutter 38 may have the key 104. The key 104 may be aligned with the slot 108 when the cutter 38 is in the cutting position, as shown in FIG. 8, and out of alignment with the slot 108 when the cutter 38 is in the spaced position, as shown in FIG. 7. Specifically, the key 104 may have a width and a length, and the width may be narrower than the length. The width of the key 104 may be shorter than the width of the slot 108, and the length of the key 104 may be shorter than the length of the slot 108 but longer than the width of the slot 108. The key 104 may thus fit through the slot 108 if the length of the key 104 is aligned with the length of the slot 108 but not if the length of the key 104 is out of alignment with the length of the slot 108.

With reference to FIG. 6, a spring 72 may extend from the slotted member 76 to the cutter 38. The spring 72 may be a helical spring or any other suitable type of spring. The spring 72 may be loaded in compression so that the spring 72 tends to push the cutter 38 out of the spaced position into the cutting position.

The spool 34 may include a mounting disc 74 coupled or fixed to the housing 32. The mounting disc 74 may retain the cutter 38 and the spring 72 relative to the spool 34.

Figure 9:
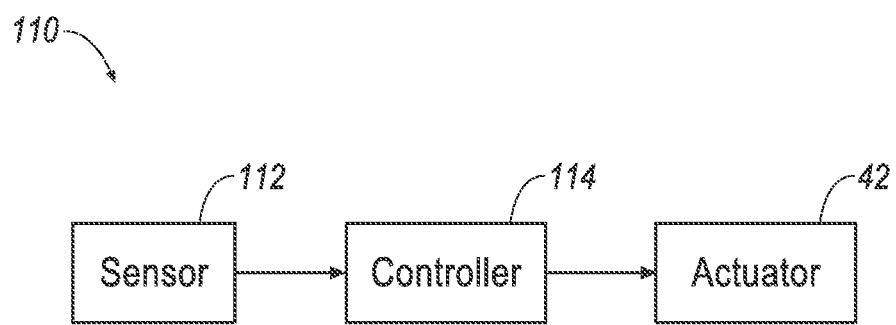
FIG. 9 is a block diagram of a control system of the restraint system.

With reference to FIG. 9, a control system 110 may include a sensor 112, a controller 114, and the actuator 42. The sensor 112 may communicate with the controller 114 by sending a signal to the controller 114. The controller 114 may communicate with the actuator 42 by sending a signal to the actuator 42. The sensor 112 may be in communication with the actuator 42, either directly or indirectly via the controller 114.

With reference to FIGS. 3 and 5, the sensor 112 may be fixed relative to the housing 32. The sensor 112 may be designed to detect at least one of the engaged state and the disengaged state of the automatic locking retractor 44. Specifically, the sensor 112 may be positioned to detect a position of the lever 92 relative to the housing 32. For example, the sensor 112 may be a Hall effect sensor, which is a transducer that varies an output voltage in response to a magnetic field. Correspondingly, the lever 92 may have a magnetic field generator 116, e.g., a permanent magnet, that is disposed on the lever 92 and moves with the lever 92. The Hall effect sensor 112 may detect the position of the lever 92 relative to the housing 32 through the proximity of a magnetic field generated by the magnetic field generator 116. Alternatively, the sensor 112 may be any other suitable sensor that can detect the position of the lever 92 or the state of the automatic locking retractor 44.

The controller 114 may be a microprocessor-based controller. The controller 114 may include a processor, memory, etc. The memory of the controller 114 may store instructions executable by the processor.

The controller 114 may be in communication with the sensor 112 and the actuator 42. The controller 114 may be programmed to instruct the actuator 42 to move the plate 40 based on a signal from the sensor 112. The controller 114 may receive a signal from the sensor 112 indicating that the automatic locking retractor 44 is in the engaged state, and the controller 114 may then send a signal to the actuator 42 to move the plate 40.

With reference to FIGS. 7 and 8, the actuator 42 may be coupled to the housing 32 and coupled to the plate 40. The actuator 42 may receive a signal from the controller 114 or directly from the sensor 112. The actuator 42 may be any suitable device to move the plate 40. For example, the actuator 42 may be a solenoid.

The plate 40 may be moveably coupled to the actuator 42. The plate 40 may be moveable between a disengaged position, as shown in FIG. 7, and an engaged position, as shown in FIG. 8. In the engaged position, shown in FIG. 8, the plate 40 may extend in the path P, partially cover the slot 108, and be adjacent the cutter 38; in the disengaged position, shown in FIG. 7, the plate 40 may be spaced from the path P, be away from the slot 108, and be spaced from the cutter 38. Thus, when the cutter 38 is in the cutting position and the key 104 of the cutter 38 is disposed in the slot 108, the plate 40 may prevent the cutter 38 from moving out of the cutting position by blocking the key 104 from moving out of the slot 108. While the spring 72 may also hold the cutter 38 in the cutting position, the plate 40 provides a redundant failsafe to keep the cutter 38 in the cutting position. The plate 40 may be any suitable barrier that prevents the key 104 from moving out of the slot 108.

With reference to FIG. 10, in operation, the restraint system 30 may begin with the webbing 52 fully retracted, the automatic locking retractor 44 in the disengaged state, the cutter 38 in the spaced position, and the plate 40 in the disengaged position, in block 1002. The occupant 50 may then extend the webbing 52, in block 1004. The webbing 52 may be fully extended or not, in decision block 1006. The occupant 50 may extend the webbing 52 only partially if, for example, the occupant 50 is an adult who is sitting in the seat 48; or, the occupant 50 may fully extend the webbing 52 from the spool 34 if, for example, the occupant 50 is installing a child car seat. If the webbing 52 is not fully extended, then the automatic locking retractor 44 remains in the disengaged state, in block 1008, and the system does nothing until the next time that the webbing 52 is extended. If the webbing 52 is fully extended from the spool 34, then the automatic locking retractor 44 assumes that a child seat is present and switches to the engaged state, in block 1010, meaning the spool 34 allows the webbing 52 to retract but not extend. The sensor 112 detects the state of the automatic locking retractor 44; for example, the cam 90 rotates so that the lever 92 is engaged with the cam surface 96, and the sensor 112 detects the increased distance of the magnetic field generator 116 on the lever 92, in block 1012. The sensor 112 signals the controller 114, in block 1014. The controller 114 signals the cutter 38 to move from the spaced position to the cutting position, and the controller 114 signals the actuator 42 to move the plate 40, in block 1016. The cutter 38 moves to the cutting position, in block 1018. The actuator 42 moves the plate 40 from the disengaged position to the engaged position, in block 1020. The plate 40 is now positioned to prevent the cutter 38 from accidentally moving out of the cutting position. In decision block 1022, if the webbing 52 feeds fully back onto the spool 34, then the restraint system 30 switches to the beginning state again, with the webbing 52 fully retract, the automatic locking retractor 44 in the disengaged state, the cutter 38 in the spaced position, and the plate 40 in the disengaged position.

In the event that the vehicle 46 is involved in a collision when the restraint system 30 is in the beginning position, an emergency locking retractor system (not shown) may engage, preventing the forward momentum of the occupant 50 from extending the webbing 52. The torsion bar 70 resists the torque on the spool 34. If the force that the occupant 50 exerts on the webbing 52 exceeds a threshold for the torsion bar 70, then the torsion bar 70 yields, allowing the spool 34 to rotate and the webbing 52 to extend a distance. The cutter 38 is in the disengaged position and so does not impede the spool 34 from rotating.

In the event that the vehicle 46 is involved in a collision when the automatic locking retractor 44 is in the engaged state, the automatic locking retractor 44 prevents the forward momentum of the occupant 50 from freely rotating the spool 34 and extending the webbing 52. The cutter 38 is in the cutting position, and the plate 40 is in the engaged position. The torsion bar 70 resists the torque on the spool 34. Additionally, if the force that the occupant 50 exerts on the webbing 52 exceeds the threshold for the torsion bar 70 and the torsion bar 70 begins to rotationally yield, then the cutter 38 cuts into the material on the disc 36, further resisting the rotation of the spool 34. The cutter 38 engages the circular, tapered strip 88 on the disc 36. Because the cross-sectional area of the strip 88 increases as the disc 36 rotates, the resisting force from the cutter 38 cutting the material correspondingly increases. The increasing resisting force is called progressive load limiting. The overall resisting force from the torsion bar 70 and the cutter 38 in the cutting position is greater than the resisting force from the torsion bar 70 alone. Thus, the force that must be exerted through the webbing 52 before the webbing 52 extends is greater when the automatic locking retractor 44 is in the engaged state than in the disengaged state. The restraint system 30 is in a higher load-limiting regime in the engaged state of the automatic locking retractor 44 than in the disengaged state.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
a housing;
a spool rotatably coupled to the housing;
a cutter moveable along a path from a spaced position spaced from the spool to a cutting position adjacent the spool;
a plate moveable between an engaged position extending in the path and a disengaged position spaced from the path; and
an actuator coupled to the plate.

2. The restraint system of claim 1, wherein the actuator is a solenoid.

3. The restraint system of claim 1, further comprising a slotted member coupled to the housing and having a slot disposed on the path, wherein the slot is positioned to accept the cutter.

4. The restraint system of claim 3, wherein the plate in the engaged position partially covers the slot, and the plate in the disengaged position is away from the slot.

5. The restraint system of claim 3, further comprising a spring extending from the slotted member to the cutter.

6. The restraint system of claim 1, wherein the cutter has a key, and the key is aligned with the slot when the cutter is in the cutting position and out of alignment with the slot when the cutter is in the spaced position.

7. The restraint system of claim 1, further comprising a Hall effect sensor in communication with the actuator.

8. The restraint system of claim 1, further comprising:
an automatic locking retractor coupled to the spool and moving between an engaged state and a disengaged state; and
a sensor in communication with the actuator and designed to detect at least one of the engaged state and the disengaged state of the automatic locking retractor.

9. The restraint system of claim 8, further comprising webbing attached to the spool, the automatic locking retractor moving to the engaged state when the webbing is fully extended.

10. The restraint system of claim 1, further comprising:
a cam fixed to the spool;
a lever mounted to the housing and engaging the cam; and
a sensor in communication with the actuator and positioned to detect a position of the lever relative to the housing.

11. The restraint system of claim 1, wherein the spool includes a circular, tapered strip radially aligned with the cutter relative to the spool.

12. A restraint system comprising:
a housing;
a spool rotatably coupled to the housing;
a cutter moveably coupled to the housing;
an actuator coupled to the housing;
a plate moveably coupled to the actuator from an engaged position adjacent the cutter to a disengaged position spaced from the cutter; and
a sensor in communication with the actuator.

13. The restraint system of claim 12, further comprising an automatic locking retractor coupled to the spool and moving between an engaged state and a disengaged state, wherein the sensor is designed to detect at least one of the engaged state and the disengaged state of the automatic locking retractor.

14. The restraint system of claim 13, further comprising a controller in communication with the sensor and actuator, the controller programmed to instruct the actuator to move the plate based on a signal from the sensor.

15. The restraint system of claim 13, further comprising webbing attached to the spool, the automatic locking retractor moving to the engaged state when the webbing is fully extended.

16. The restraint system of claim 12, wherein the cutter is moveable along a path from a spaced position spaced from the spool to a cutting position adjacent the spool, further comprising a slotted member coupled to the housing and having a slot disposed on the path, wherein the slot is positioned to accept the cutter.

17. The restraint system of claim 16, wherein the cutter has a key, and the key is aligned with the slot when the cutter is in the cutting position and out of alignment with the slot when the cutter is in the spaced position.

18. The restraint system of claim 16, wherein the plate in the engaged position partially covers the slot, and the plate in the disengaged position is away from the slot.

19. The restraint system of claim 16, further comprising a spring extending from the slotted member to the cutter.

20. The restraint system of claim 12, further comprising a cam fixed to the spool and a lever mounted to the housing and engaging the cam, wherein the sensor is positioned to detect a position of the lever relative to the housing.

* * * * *